United States Patent [19]
Choi

[11] Patent Number: 5,953,015
[45] Date of Patent: Sep. 14, 1999

[54] DETERMINING THE LEVEL OF DETAIL FOR TEXTURE MAPPING IN COMPUTER GRAPHICS

[75] Inventor: Sang-Gil Choi, Santa Clara, Calif.

[73] Assignee: Samsung Electronics Co., Ltd., Seoul, Rep. of Korea

[21] Appl. No.: 08/749,859

[22] Filed: Nov. 15, 1996

[51] Int. Cl.$^6$ .................................................. G06F 15/00
[52] U.S. Cl. .................................................. 345/430
[58] Field of Search .................................. 364/722, 723; 345/430, 433, 440, 441

[56] References Cited

U.S. PATENT DOCUMENTS 5,553,012   9/1996   Buss et al. ........................... 364/722

OTHER PUBLICATIONS

Ferraro, Richard F., "Learn 3D Graphics Programming on the PC" (Addison–Wesley Developers Press 1996), pp. 353–415.

Segal, M. et al., "Fast Shadows and Lighting Effects Using Texture Mapping", *Computer Graphics*, 26, 2, Jul. 1992, pp. 249–252.

Foley, J.D. et al., "Computer Graphics: Principles and Practice" (Addison–Wesley Publishing Company, 2nd ed. in C, 1996), pp. 826–828.

Heckbert, P.S., "Survey of Texture Mapping", *IEEE Computer Graphics and Applications* (1986), pp. 56–67.

Williams, L., "Pyramidal Parametrics", *Proceedings of Siggraph '83, Computer Graphics*, vol. 17, No. 3, Jul. 1983, pp. 1–11.

Knittel, G. et al., "Hardware for Superior Texture Performance", *Proceedings of 10th Eurographics Workshop on Graphics Hardware* (1995), pp. 33–40.

Ackermann, H., "Single Chip Hardware Support for Rasterization and Texture Mapping", *Proceedings of 10th Eurographics Workshop on Graphics Hardware* (1995), pp.15–24.

*Primary Examiner*—Phu K. Nguyen
*Attorney, Agent, or Firm*—Skjerven, Morrill, MacPherson, Franklin & Friel; Michael Shenker

[57]                ABSTRACT

A fast and simple circuit for generating the MIP map LOD (level of detail) uses a look-up table (LUT) that stores values (½)$\log_2$ ($X^2+Y^2$), wherein: (1) X and Y are in a single quadrant of the (X, Y) plane, for example, $X \geq 0$, $Y \geq 0$; (2) $X \leq Y$ or $Y \leq X$; and (3) X or Y are in a predetermined interval, for example, $1 \leq X \leq 2$; the interval is smaller than the maximum range of X or Y respectively.

33 Claims, 5 Drawing Sheets

DETERMINING THE LEVEL OF DETAIL FOR TEXTURE MAPPING IN COMPUTER GRAPHICS

BACKGROUND OF THE INVENTION

The present invention relates to computer graphics, and more particularly to determining the level of detail (LOD) for texture mapping in computer graphics.

Textures are used in computer graphics to make computer images appear more realistic. A texture consists of a number of texture elements ("texels"). Each texel has a value corresponding to a color, intensity, or some other image parameter. The texture is mapped onto a whole or a portion of the image displayed by the computer. The mapping establishes a correspondence between pixels in the computer image and texels. Once the correspondence is established, the pixel color, intensity, or other parameters are modified by the texel values.

If the image onto which the texture is mapped is smaller than a texture, a pixel may correspond to more than one texel. This may happen, for example, when the computer displays an object moving away from the viewer. As the object moves away, it looks smaller. Therefore, the object's image on the screen is made smaller. Hence, the image includes fewer pixels. However, the texture size remains the same. Therefore, a pixel may correspond to a larger number of texels.

When a pixel corresponds to more than one texel, a filtering operation is performed. Filtering involves determining an average (perhaps a weighted average) of the texel values corresponding to the pixel. The averaged value is used to modify the pixel value.

To avoid performing the filtering in real time, it has been proposed to pre-filter the textures. See, for example, L. Williams, "Pyramidal Parametrics", Proceedings of SIGGRAPH '83, Computer Graphics, Vol. 17, no. 3, July 1983, pages 1–11. In that article, pre-filtered textures are called MIP maps. The MIP map of level 0 is the original texture itself. In the MIP map of level 1, each texel value is the average of respective four texel values from the MIP map of level 0; in the MIP map of level 2, each texel value is the average of respective four texel values from the MIP map of level 1; and so on. The MIP map level is called the "level of detail" (LOD). When the object is being displayed, the texel value which is to modify a pixel is taken from one of the MIP maps. Filtering in real time is not required.

It is desirable to provide fast and simple circuits and methods for determining the LOD so that the appropriate MIP map can be determined fast in real time.

SUMMARY

The present invention provides methods and circuits for determining the LOD. In some embodiments, the circuits are fast and simple.

In some embodiments, these advantages are achieved by using a look-up table (LUT) to determine the LOD values. More particularly, LOD is determined as:

$$\max\{(\tfrac{1}{2})\log_2[(\partial u/\partial x)^2+(\partial v/\partial x)^2],$$

$$(\tfrac{1}{2})\log_2[(\partial u/\partial y)^2+(\partial v/\partial y)^2]\}$$

where (u,v) are the texture coordinates of the point (x,y) in the original texture.

The LUT stores the values:

$$\text{LODT}=(\tfrac{1}{2})\log_2(X^2+Y^2).$$

To reduce the circuit cost and surface area, the LUT stores only the LODT values for X and Y satisfying one or more of the following conditions:

(1) X and Y are in a predetermined quadrant of the (X,Y) plane, for example, $X \geq 0$, $Y \geq 0$;

(2) one of X and Y does not exceed the other one of X and Y, for example, $Y \leq X$;

(3) X or Y is in a predetermined interval smaller than the maximum range of X or Y respectively; for example, X is in the interval $1 \leq X \leq 2$ or $2 \leq X \leq 4$.

Fast and inexpensive circuitry is provided to convert $\partial u/\partial x$, $\partial v/\partial x$, $\partial u/\partial y$, $\partial v/\partial y$ to signals satisfying one or more of the conditions (1), (2), (3), and to convert the LUT output to the LOD value.

This LOD Value can be fractional. The MIP map level is determined as the integer portion of LOD or the integer closest to the LOD. Alternatively, two MIP maps are used having the levels immediately below and immediately above the LOD value. The texel value used to modify the pixel is obtained by linear interpolation between texel values of the two MIP maps. In each of the two MIP maps, the appropriate texel value is determined, for example, by the "nearest neighbor" method or bilinear interpolation. (Bilinear interpolation averages the values of the four texels closest to (u,v).) Thus, the texel value used to modify the pixel can be obtained using the "nearest neighbor" method, bilinear or trilinear filtering, or some other method known in the art or yet to be discovered.

Other features and advantages of the invention are described below. The invention is defined by the appended claims.

DESCRIPTION OF PREFERRED EMBODIMENTS

Figure 1:
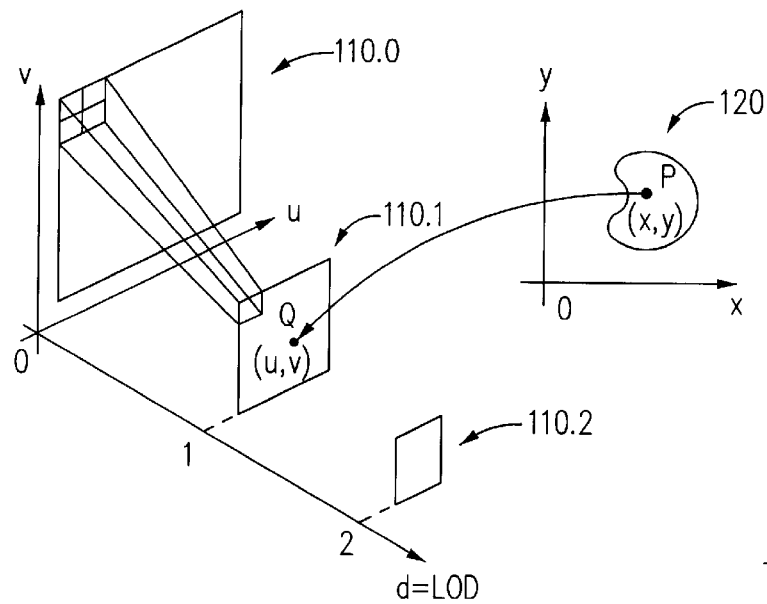
FIG. 1 illustrates MIP maps and the mapping from an object image on a computer screen into a MIP map.

FIG. 1 shows MIP maps 110.0, 110.1, 110.2 for a predefined texture. Textures are described, for example, in the following publications incorporated herein by reference: R. F. Ferraro, "Learn 3D Graphics Programming on the PC" (1996), pages 353–415; M. Segal et al., "Fast Shadows and Lighting Effects Using Texture Mapping", Computer Graphics, 26, 2, July 1992, pages 249–252. MIP maps are described, for example, in the following publications incorporated herein by reference: J. D. Foley et al., "Computer Graphics: Principles and Practice" (2nd ed. in C, 1996), pages 826–828; L. Williams, "Pyramidal Parametrics", Proceedings of SIGGRAPH '83, Computer Graphics, Vol. 17, No. 3, July 1983, pages 1–11; G. Knittel et al., "Hardware for Superior Texture Performance", Proceedings of 10th Eurographics Workshop on Graphics Hardware (1995), pages 33–40; H. Ackermann, "Single Chip Hardware Support for Rasterization and Texture Mapping", Proceedings of 10th Eurographics Workshop on Graphics Hardware (1995), pages 15–24.

Each value in each MIP map represents the image color, intensity, and/or other parameters. Map 110.0 is the original texture. Each texel in map 110.1 is the average of four respective texels in map 110.0, each texel in map 110.2 is the average of four respective texels in map 110.1, and so on. Each map 110.$d$ is assigned an LOD (level of detail) parameter d.

Each map has a "texture" Cartesian coordinate system (u, v).

FIG. 1 also illustrates an object image 120 in a computer screen. The screen has a "screen" Cartesian coordinate system (x, y). When image 120 is displayed, each pixel P(x, y) in image 120 is mapped into a corresponding texel Q in one of maps 110. Once the coordinates (u, v) of texel Q are determined from (x, y), the texel is used to modify color, intensity, or perhaps other parameters of the point P.

Suppose that the texture mapping of image 120 to map 110.0 maps a pixel of a unit area onto a figure of area A. Then LOD is determined as follows:

$$\text{LOD} = (\tfrac{1}{2})\log_2 A \tag{1}$$

For ease of computation, it will be assumed that $$A = q^2, \text{ where} \tag{2}$$

$$q = \max\left(\sqrt{(\partial u/\partial x)^2 + (\partial v/\partial x)^2},\ \sqrt{(\partial u/\partial y)^2 + (\partial v/\partial y)^2}\right)$$

and (u,v) are the texture coordinates of the point (x,y) in the original texture 110.0. See, for example, "Hardware for Superior Texture Performance", cited above, page 34. Combining (1) and (2), we obtain:

$$\text{LOD} = (\tfrac{1}{2})\log_2\{\max[\partial u/\partial x)^2 + (\partial v/\partial x)^2,$$

$$(\partial u/\partial y)^2 + (\partial v/\partial y)^2]\} \tag{3}$$

From equation (3), LOD can be determined using two addition operations, four multiplication operations, one max (comparison) operation, one logarithmic operation, and one right shift. This requires a large amount of hardware resources and large calculation time.

The following technique makes calculation faster and simpler. From equation (3), it follows that:

$$\text{LOD} = \max\{(\tfrac{1}{2})\log_2[(\partial u/\partial x)^2 + (\partial v/\partial x)^2],$$

$$(\tfrac{1}{2})\log_2[(\partial u/\partial y)^2 + (\partial v/\partial y)^2]\} \tag{4}$$

Using the equation (4), the computation is made faster and simpler by providing a lookup table (LUT) for the values of the following function:

$$\text{LODT}(X,Y) = (\tfrac{1}{2})\log_2(X^2 + Y^2) \tag{5}$$

Figure 2:
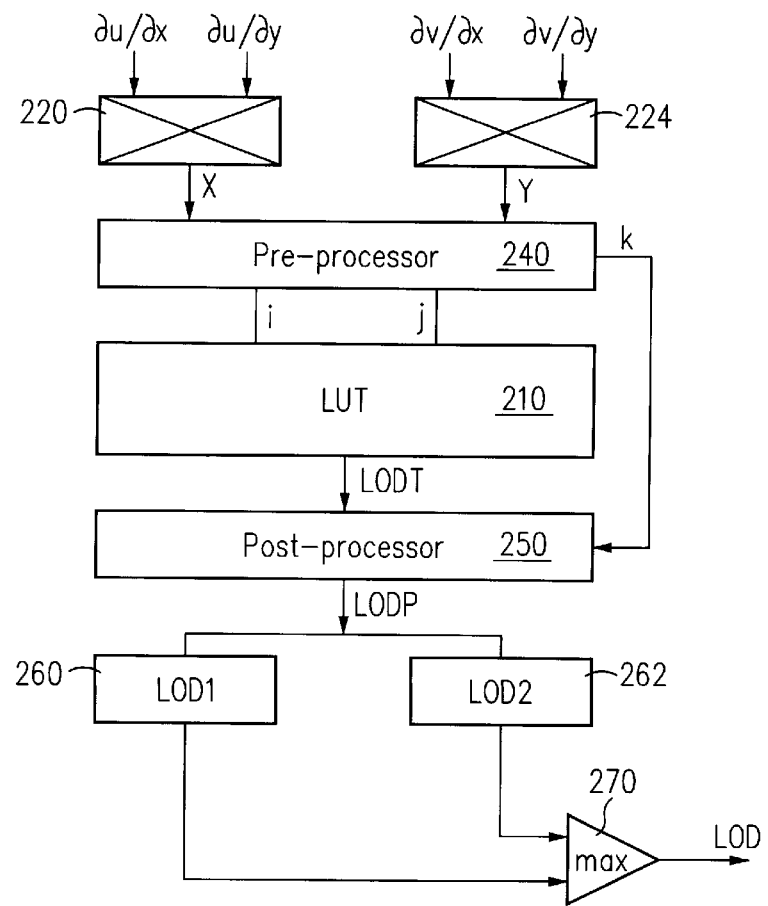
FIG. 2 is a block diagram of a circuit generating the LOD in accordance with the present invention.

The lookup table circuit is shown at 210 in FIG. 2. The circuit of FIG. 2 determines LOD as follows. The signals $u_x = \partial u/\partial x$, $u_y = \partial u/\partial y$ are provided to respective inputs of 2-to-1 multiplexer 220. The signals $v_x = \partial v/\partial x$, $v_y = \partial v/\partial y$ are provided to inputs of 2-to-1 multiplexer 224. A select signal (not shown) causes the two multiplexers to select either the pair $(u_x, v_x)$ or the pair $(u_y, v_y)$. The selected pair is provided as signals X, Y to pre-processor 240. Pre-processor 240 generates the respective indices i, j for LUT 210. The output LODT of LUT 210 is provided to post-processor 250. Post-processor 250 also receives a signal k (described below) generated by pre-processor 240. Post-processor 250 generates the following signal LODP (partial LOD):

$$\text{LODP} = (\tfrac{1}{2})\log_2(X^2 + Y^2) \tag{6}$$

Thus, if multiplexers 220, 224 selected $u_x$, $v_x$, then $$\text{LODP} = (\tfrac{1}{2})\log_2[(u_x)^2 + (v_x)^2].$$

In this case, signal LODP is latched in register 260. If multiplexers 220, 224 selected $u_y$, $v_y$, then $$\text{LODP} = (\tfrac{1}{2})\log_2[(u_y)^2 + (v_y)^2].$$

This value of LODP is latched in register 262.

Multiplexers 220, 224 select $u_x$, $v_x$ at one point of time and $u_y$, $v_y$ at another point of time. Max circuit 270 generates the maximum of the outputs of registers 260, 262. This maximum is LOD.

Figure 3:
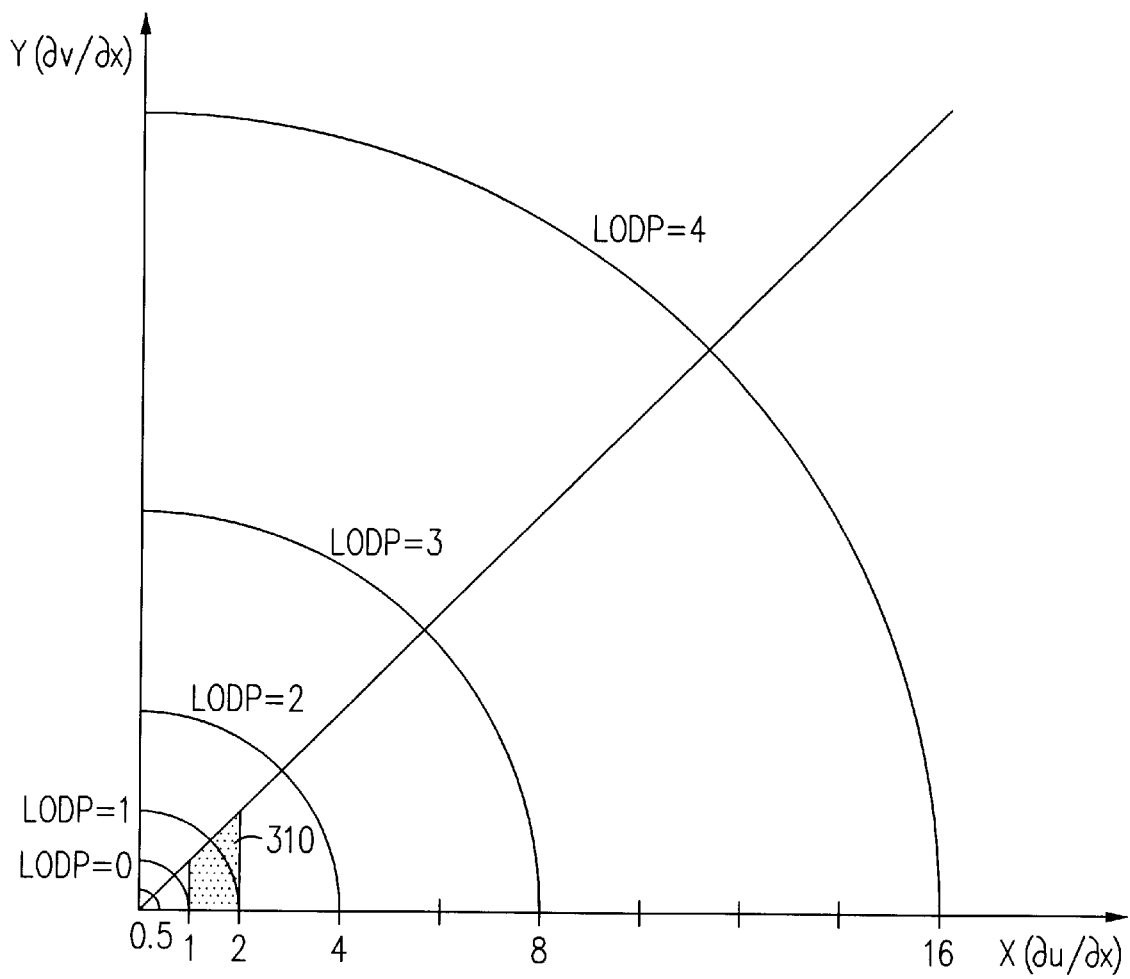
FIGS. 3 and 4 are graphs illustrating values stored in the LUT in the circuit of FIG. 2.

FIG. 3 illustrates a technique used to reduce the size of LUT 210. Since the right-hand side of equation (5) for LODT does not depend on the sign of X and Y, the LUT stores only LODT values for $X \geq 0$, $Y \geq 0$. Further, since the function LODT is symmetric with respect to X and Y, LUT 210 stores only the values for $Y \leq X$.

The size of LUT 210 is reduced further by having LUT 210 store only the values for which $1 \leq X \leq 2$, that is, only the values in the shaded area 310 in FIG. 3. If X is not in the interval [1, 2], X and Y are divided by a factor F such that X/F is in the interval [1, 2]. From (6) we obtain:

$$\text{LODP} = (\tfrac{1}{2})\log_2[(X/F)^2 + (Y/F)^2] + \log_2 F \tag{7}$$

The factor F is selected to be an integer power of 2, that is, $F = 2^k$ for some k. Thus, $$\text{LODP} = (\tfrac{1}{2})\log_2[(X/F)^2 + (Y/F)^2] + k \tag{8}$$

The power k is set to 1 for X in the interval [2,4), k=2 for X is in the interval [4,8), and so on. k is constant in the interval $2^k \leq X < 2^{k+1}$. In particular, k=0 for X in the interval [1,2), and k=−1 for X in the interval [0.5, 1). If X is in the interval [0, 0.5), k is set to −2 to avoid generation of negative LOD values.

Pre-processor 240 (FIG. 2) performs a fast division by F using a technique described below. Pre-processor 240 also generates the signal k. Post-processor 250 adds k to LODT thus generating the signal LODP=LODT+k. If LODT+k is negative, post-processor 250 sets LODP to 0 to avoid generating a negative LOD value.

Figure 4:
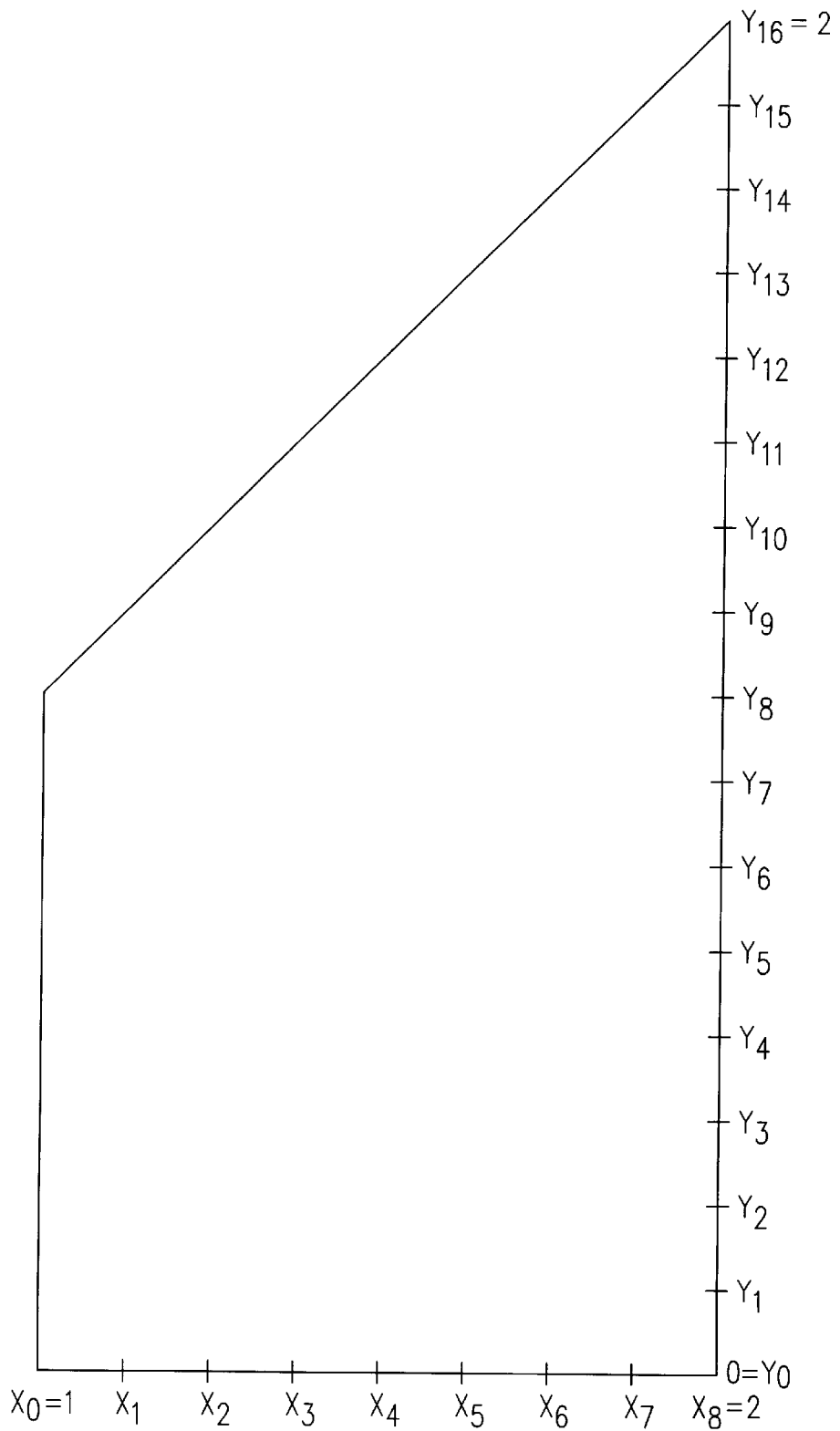

LUT 210 is constructed as follows. As shown in FIG. 4, the interval $1 \leq X \leq 2$ is divided into n equal parts by points $X_0=1$, $X_1=1+1/n$, $X_2=1+2/n$, ... $X_n=2$. The number n is a power of 2. In FIG. 4, n=8.

Similarly, the interval $0 \leq Y \leq 2$ is divided into 2n equal parts by the points $Y_0=0$, $Y_1=1/(2n)$, $Y_2=2/(2n)$, ... $Y_{2n}=2$.

LUT 210 stores the following values:

$$(\tfrac{1}{2})\log_2(X_i^2 + Y_j^2), \tag{9}$$

where $0 \leq i \leq n-1$, $0 \leq j \leq 2n-1$. In some other embodiments, $1 \leq i \leq n$ and/or $1 \leq j \leq 2n$.

In the embodiment described immediately below, instead of the values (9), for each pair (i,j) LUT 210 stores the value:

$$(\tfrac{1}{2})\log_2(X_{mi}^2 + Y_{mj}^2),$$

where $$X_{mi} = (X_i + X_{i+1})/2,$$

$$Y_{mj} = (Y_j + Y_{j+1})/2.$$

The indices i, j are provided to LUT 210 by pre-processor 240, as shown in FIG. 2.

Figure 5:
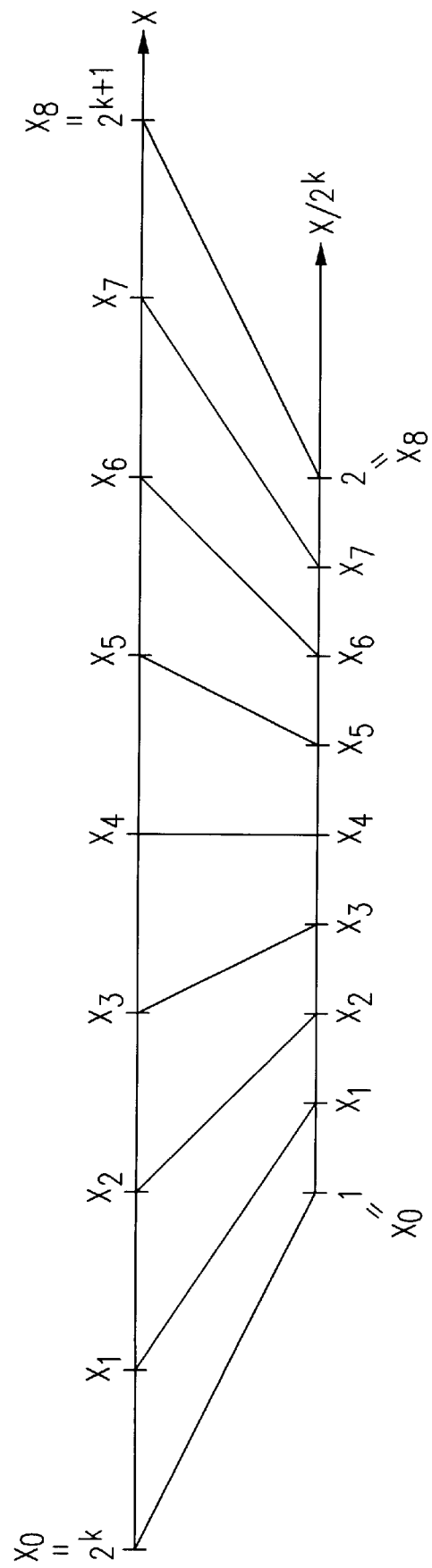
FIG. 5 is a graph illustrating how the circuit of FIG. 2 generates LUT inputs.
Figure 6:
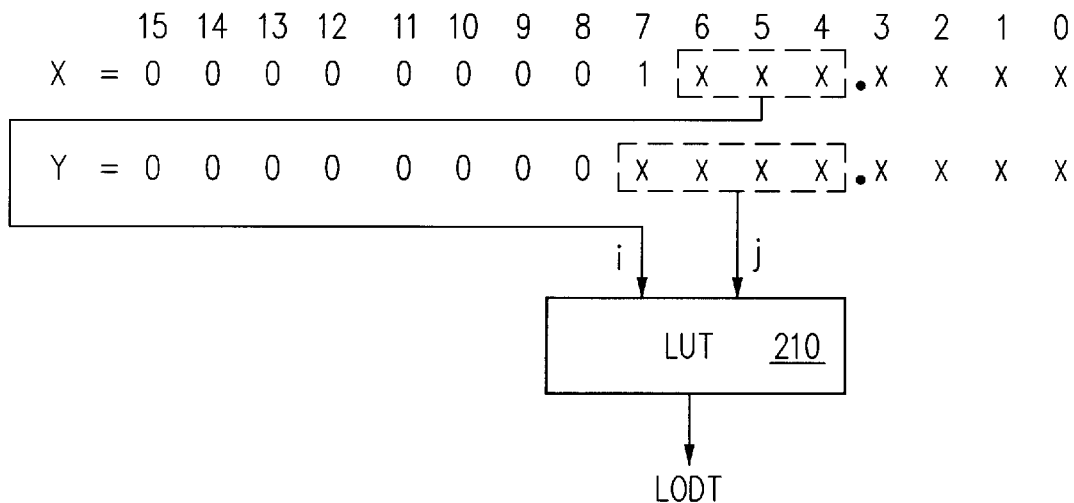
FIG. 6 illustrates bit values for one example of FIG. 5.

FIGS. 5 and 6 illustrate the division X/F, Y/F performed by pre-processor 240. Let X be in the interval $2^k \leq X < 2^{k+1}$ for some k. The interval $[2^k, 2^{k+1}]$ is divided into n equal parts by the points $x_0 = 2^k$, $x_1 = 2^k + 2^k/n$, ... $x_n = 2^{k+1}$. FIG. 5 illustrates these points for n=8. If X is in the interval $[x_i, x_{i+1}]$, then X/F is assumed to equal $X_i$, and the index i is provided to LUT 210.

In some embodiments, this method is implemented as illustrated in FIG. 6. In this example, $u_x$, $v_x$, $u_y$, $v_y$ are 16-bit fixed point quantities. Their fraction occupies the four least significant bits [3:0]. The integer portion occupies the remaining bits [15:4].

In FIG. 6, n=8. In some embodiments with n other than 8, the number of fraction bits in $u_x$, $v_x$, $u_y$, $v_y$, is $\log_2 n+1$.

The inputs i, j to LUT 210 are generated as follows. Pre-processor 240 determines the position of the most significant "1" in the value X. In the example of FIG. 6, the most significant "1" is in bit position 7. The next 3 less significant bits (bits [6:4] in FIG. 6) provide the index i. More generally, for n not necessarily equal to 8, the index i is provided by the next $\log_2 n$ bits following the most significant "1".

The value j is formed by the Y bit in the same position as the most significant "1" in X, and by the next $\log_2 n$ bits of Y. In FIG. 6, j=Y[7:4].

When i and j are being determined, the binary point is ignored. For example, if the most significant "1" in X is in position 4 (that is, if X[15:5]=0 and X[4]=1), then i=X[3:1] and j=Y[4:1]; i and j are integers; the binary point is ignored.

If X<0.5, then i and j are "don't care" because in this case k=-2 and LODP will be set to 0 in post-processor 250 by the k signal.

In some embodiments of FIGS. 4–6, pre-processor 240 operates as described in the C-like pseudo-code below. This pseudo-code can be easily translated into a hardware description language such as Verilog®. Verilog is described, for example, in D. E. Thomas and P. Moorby, "The Verilog® Hardware Description Language" (1991) incorporated herein by reference. In the pseudo-code, comments start with the symbol "/*" and end with the symbol "*/".

In the pseudo-code embodiment below, the LOD does not exceed 2, that is, only three MIP maps 110.0 through 110.2 are provided. Consequently, k does not exceed 2. If $X^2+Y^2 \geq 16$, LODP is set to 2.

The pseudo-code for pre-processor 240 is as follows.
/* Determine the absolute values of X and Y. In some embodiments, the inputs $u_x$, $u_y$, $v_x$, $v_y$ are in two's complement form. */
if X<0 then X1=-X else X1=X.
if Y<0 then Y1=-Y else Y1=Y.
/* Make Y≦X */
if Y1>X1 then
  {X2=Y1; Y2=X1} /* interchange X and Y */
else (X2=X1, Y2=Y1}.
/* Determine i, j and k. */
if X2[15:6] !=0 /* !=means NOT EQUAL */ then
  {i=0; j=0; k=2} /* to generate LODP=2 */
else if X2[5]=1 then
  {i=X2[4:2]; j=Y2[5:2]; k=1}
else if X2[4]=1 then
  {i=X2[3:1]; j=Y2[4:1]; k=0}
else if X2[3]=1 then
  {i=X2[2:0]; j=Y2[3:0]; k=-1}
else /* X<0.5; i and j are "don't care" */
  {i=0; j=0; k=-2}.

In some embodiments, each entry in LUT 210 is stored in a fixed point format. Each entry has a 1-bit integer portion and a 7-bit fraction.

Figure 7:
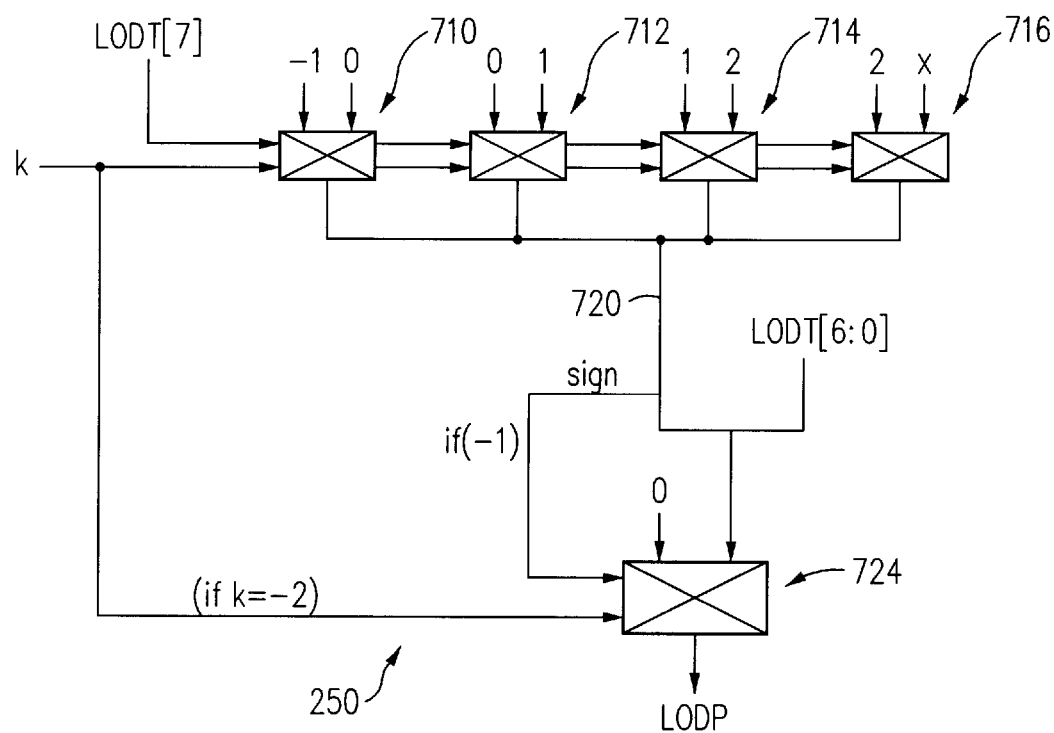
FIG. 7 is a circuit diagram of a portion of the circuit of FIG. 2.

Post-processor 250 adds LODT and k. To increase the speed, post-processor 250 is implemented by multiplexers in some embodiments. See FIG. 7. The integer bit LODT[7] of the output of LUT 210 is delivered to the select inputs of multiplexers 710, 712, 714, 716. The multiplexers also receive the signal k. If k=-1, multiplexer 710 is enabled and the remaining multiplexers 712, 714, 716 are disabled (i.e., their outputs are tri-stated). If LODT[7]=0, multiplexer 710 selects its data input tied to -1. If LODT[7]=1, multiplexer 710 selects its data input tied to 0.

Similarly, the k value of 0, 1, 2 enables respectively multiplexer 712, 714 or 716 and disables the remaining ones of multiplexers 710–716. If LODT[7]=0, the enabled multiplexer 712, 714 or 716 selects respectively its data input 0, 1 or 2. If LODT[7]=1, the enabled multiplexer 712, 714 or 716 selects respectively 1, 2 or "x" ("don't care").

In some embodiments, multiplexer 716 is replaced with a pass gate having the value "2" at its input. The pass gate is enabled when k=2 and disabled otherwise.

The outputs of multiplexers 710, 712, 714, 716 are connected to the output 720 which provides the integer portion of LODP to one data input of 2-to-1 multiplexer 724. The fraction portion LODT[6:0] (the fraction of LODT) is provided to the same input of MUX 724. The other data input of MUX 724 is tied to 0. The select inputs of MUX 724 receives the signal k and the sign portion of the output 720. If k=-2 or the sign portion of output 720 indicates a negative value, MUX 724 selects zero for LODP. Otherwise, MUX 724 selects the other input, i.e., the combination of output 720 and LODT[6:0].

Table 1 below illustrates the average and maximum errors for the LOD in some embodiments of FIG. 2. The error was calculated as:

$$|LOD-LOD_{prec}|/LOD_{prec}$$

where LOD was determined by the circuit of FIG. 2 (as the output of max circuit 270), and $LOD_{prec}$ was determined from the equation (3) by computer computation. The average and maximum errors were determined from a number of randomly generated samples of $u_x$, $v_x$, $u_y$, $v_y$ such that at least one of $u_x$, $v_x$, $u_y$, $v_y$ was non-zero.

TABLE 1

| number of partitions of interval [1,2] (see FIG. 4) | average error | max error |
|---|---|---|
| 4 | 0.98% | 11.4% |
| 8 | 0.49% | 5.7% |
| 16 | 0.24% | 3.06% |

The appendix at the end of this description includes a simulation program for an embodiment in which the LUT stores the LOD values for the following region:

$$1 \leq X \leq 2; \ Y \leq X.$$

The simulation program is written in the programming language C.

Once the LOD is determined, the texel value is found using techniques that are known or yet to be discovered. For example, in some embodiments, the texel value is determined using the "nearest neighbor" method (also called "point sampling"), or using bilinear filtering (also called "bi-linear blending"; this is bilinear interpolation in a MIP map), or trilinear filtering (also called "tri-linear blending"; this is bilinear interpolation in two adjacent MIP maps followed by linear interpolation between the two MIP maps). See the following publications incorporated herein by reference: R. F. Ferraro, "Learn 3D Graphics Programming on the PC" (1996), pages 370–372; P. S. Heckbert, "Survey of Texture Mapping", IEEE Computer Graphics and Applications (1986), pages 56–67; H. Ackermann, "Single Chip Hardware Support for Rasterization and Texture Mapping", cited above.

The above embodiments illustrate but do not limit the invention. The invention is defined by the appended claims.

APPENDIX

```
#include <math.h>
#include <stdio.h>
#define MAX(a, b)      ((a > b) ? a : b)
float fscale[33];
main()
{
int i,j,k;
int x, y;
int lod_int;
double dudx, dudy, dvdx, dvdy;
double maximum, average, lod, temp;
unsigned fixed_dudx, fixed_dvdx;
float lod1, lod2;
float err, max_err;
float mem[8][16];
max_err = 0.0;
average = 0.0;
fscale[0] = 1.0;
for(i = 1; i < 32; i++)
    fscale[i] = fscale[i-1] + fscale[i-1];
/*** generate LUT ************************/
/*** 8 partition from 1 to 2 in X coordinate ****/
for(i=0;i<8;i++) {
    dudx = (float)i / 8.0 + 1.0 + 1.0/16.0;
    for(j=0;j<16;j++) {
        dvdx = (float)j / 8.0 + 1.0/16.0;
        temp = dudx*dudx + dvdx*dvdx;
        mem[i][j] = 0.5 * (log(temp)/log(2.0));
    }
}
for(i=0;i<1000;i++) {
/*** The interval of random generation values ***/
/*** : 0 ~ 2^^5(32) -1                        ***/
    dudx = (double) (rand())/67108864.0;
    dudy = (double) (rand())/67108864.0;
    dvdx = (double) (rand())/67108864.0;
    dvdy = (double) (rand())/67108864.0;
    printf("dudx=%f dudy=%f dvdx=%f dvdy=%f\n",
        dudx, dudy, dvdx, dvdy);
/**** LOD value generation by original equation ***/
    maximum = MAX(sqrt(dudx*dudx + dvdx*dvdx),
                  sqrt(dudy*dudy + dvdy*dvdy));
    lod = log(maximum)/log(2.0);
/**** LOD value generation by invention **********/
    for(k=0;k<2;k++) {
        if(k) {
            dudx = dudy; dvdx = dvdy;}
/*** make positive ****************/
        if(dudx<0) dudx = -dudx;
        if(dvdx<0) dvdx = -dvdx;
/*** swap for larger dudx than dvdx ****/
        if(dvdx>dudx) {
            temp = dudx;
            dudx = dvdx;
            dvdx = temp;
        }
/*** input value normalization ********/
/***    to the interval 1 ~ 2     ********/
        assign_bit_32(&fixed_dudx,4,(float)dudx);
        assign_bit_32(&fixed_dvdx,4,(float)dvdx);
        if(0x100&fixed_dudx) {
/*** du/dx is located [16 ~ 32] ***/
            x = (fixed_dudx >> 5) & 0x7;
            y = (fixed_dvdx >> 5) & 0xf;
            lod_int = 4;
        }
```

APPENDIX-continued

```
        else if(0x80&fixed_dudx) {
/*** du/dx is located [8 ~ 16] ***/
            x = (fixed_dudx >> 4) & 0x7;
            y = (fixed_dvdx >> 4) & 0xf;
            lod_int = 3;
        }
        else if(0x40&fixed_dudx) {
/*** du/dx is located [4 ~ 8] ***/
            x = (fixed_dudx >> 3) & 0x7;
            y = (fixed_dvdx >> 3) & 0xf;
            lod_int = 2;
        }
        else if(0x20&fixed_dudx) {
/*** du/dx is located [2 ~ 4] ***/
            x = (fixed_dudx >> 2) & 0x7;
            y = (fixed_dvdx >> 2) & 0xf;
            lod_int = 1;
        }
        else if(0x10&fixed_dudx) {
/*** du/dx is located [1 ~ 2) ***/
            x = (fixed_dudx >> 1)& 0x7;
            y = (fixed_dvdx >> 1)& 0xf;
            lod_int = 0;
        }
        else if(0x8&fixed_dudx) {
/*** du/dx is located [0.5 ~ 1) ***/
            x = fixed_dudx & 0x7;
            y = fixed_dvdx & 0xf;
            lod_int = -1;
        }
        else {
/*** du/dx is located below 0.5 ***/
            x = y = 0;
            lod_int = -2;
        }
/*** Post-processing for integer value of LOD    ***/
/*** In the implementation,                      ***/
/*** We don't use any adder. We use just MUX's   ***/
/*** because there are a few cases.              ***/
        if(k) lod2 = mem[x][y] + (float)lod_int;
        else lod1 = mem[x][y] + (float)lod_int;
    }
    lod1 = MAX(lod1, lod2);
/*** Actually negative LOD value is no meaning ***/
    if(lod1 < 0.0) lod1 = 0.0;
/**** Error estimation ****************************/
    if(lod > 0.0) {
        err = fabs(lod-lod1)*100.0/lod;
        if(err > max_err) max_err = err;
    }
    else err = 0.0;
    average += err;
    printf("%\t Real = %f, PATENT = %f, Error = %f\n\n",
        lod, lod1, err);
}
average /= 1000.0;
printf("\n Max Error = %f, Average Error = %f\n\n",
        max_err, average);
}
/*** Function for transformation from
***/
/*** floating-point variable to fixed-point variable
***/
/***
***/
/***    destin : fixed-point output
***/
/***    fbit   : the bit number of fraction part
***/
/***    fnum   : floating-point input
***/
assign_bit_32(destin,fbit,fnum)
unsigned *destin;
int fbit;
float fnum;
{
/* integer and fractional parts of fnum */
int sign,db_int,db_fct;
```

APPENDIX-continued

```
float tmp;
sign = 1;
if(fnum < 0) {
    sign = -1;
    fnum = -fnum;
}
db_int = (int) fnum;
tmp = fnum - (float) db_int;
db_fct = (int) (tmp * fscale[fbit]);
*destin = db_int << fbit;
*destin = *destin | db_fct;
if(sign == -1) *destin = -*destin;
}
```

I claim:

1. A method for determining a level of detail (LOD) to perform texture mapping to create an image by a computer, the method comprising:

obtaining signals S1 representing derivatives of texture coordinates (u, v) with respect to a screen coordinate;

providing said signals to a circuit including a look-up table (LUT) which stores values of a function FN of at least two variables X and Y such that, for any positive constant F, $$FN(X/F, Y/F) = FN(X, Y) + k(F)$$

where $k(F)$ is a function of F but not of X and Y;

the circuit using the LUT to generate the LOD.

2. The method of claim 1 further comprising:

obtaining signals S2 representing derivatives of the texture coordinates with respect to another screen coordinate; and providing the signals S2 to the circuit to obtain the LOD.

3. The method of claim 1 wherein the LUT stores values representing $(\tfrac{1}{2})\log_2(X^2+Y^2)$ for pairs (X,Y), such that for all the values in the LUT, $0 \leq Y \leq X$.

4. The method of claim 3 wherein when the circuit uses the LUT to generate the LOD, the circuit performs as follows:

the circuit determines the values $\alpha$ and $\beta$ such that $\alpha$ represents the maximum of the absolute values represented by signals S1 at inputs of the circuit and $\beta$ represents the minimum of said absolute values;

the circuit provides values $\alpha$ and $\beta$ to the LUT;

the circuit generates the LOD from the LUT output.

5. The method of claim 4 wherein for all the values in the LUT, X is in a predetermined interval, and $\alpha$ is in said predetermined interval, and $\beta$ is such that $0 \leq \beta \leq \alpha$.

6. The method of claim 5 wherein for all the values in the LUT, $1 \leq X \leq 2$.

7. The method of claim 1 wherein:

$$FN(-X,Y) = FN(X,Y);$$
   $$FN(X,-Y) = FN(X,Y);$$

and $$FN(X,Y) = FN(Y,X).$$

8. The method of claim 1 wherein the LUT stores only values of the function FN for X in a predetermined interval, and when X is out of said predetermined interval the circuit calculates FN(X, Y) as FN(X/F, Y/F)+k(F) where F is such that X/F is in said predetermined interval, the value FN(X/F, Y/F) being provided by the LUT.

9. The method of claim 1 wherein $$FN(X,Y) = A * \log_2(X^2 + Y^2)$$

where

A is a predetermined constant.

10. The method of claim 9 wherein the LUT stores only values of the function FN for X in a predetermined interval, and when X is out of said predetermined interval the circuit calculates FN(X, Y) as FN(X/F, Y/F)+k(F) where F is such that X/F is in said predetermined interval, the value FN(X/F, Y/F) being provided by the LUT.

11. A method for determining a level of detail (LOD) to create an image by a computer, the method comprising:

providing a circuit including a look-up table (LUT) to compute the level of detail, wherein the LUT stores values of a function FN of at least two variables X and Y such that, for any positive constant F, $$FN(X/F, Y/F) = FN(X, Y) + k(F)$$

where $k(F)$ is a function of F but not of X and Y;

obtaining signals representing $\partial u/\partial x$ and $\partial v/\partial x$ where (u,v) are texture coordinates of image points and x is a screen coordinate of image points;

providing said signals to the circuit;

the circuit using the LUT to generate the LOD.

12. The method of claim 11 further comprising:

obtaining signals representing $\partial u/\partial y$ and $\partial v/\partial y$ where y is a screen coordinate of image points; and providing signals representing $\partial u/\partial y$ and $\partial v/\partial y$ to the circuit to obtain the LOD.

13. The method of claim 11 wherein the LUT stores values representing $(\tfrac{1}{2})\log_2(X^2+Y^2)$ for pairs (X,Y), such that for all the values in the LUT, $0 \leq Y \leq X$.

14. The method of claim 13 wherein when the circuit uses the LUT to generate the LOD, the circuit performs as follows:

the circuit determines the absolute values of $\partial u/\partial x$ and $\partial v/\partial x$, and determines the values X1 and Y1 such that X1 is the maximum of the absolute values of $\partial u/\partial x$ and $\partial v/\partial x$ and Y1 is the minimum of the absolute values of $\partial u/\partial x$ and $\partial v/\partial x$;

the circuit generates a first signal from the value X1 and a second signal from the value Y1, and the circuit provides the first and second signals as respective inputs X and Y to the LUT;

the circuit generates the LOD from the LUT output.

15. The method of claim 14 wherein for all the values in the LUT, X belongs to a predetermined interval, and the first signal represents a value XX1 which is in the predetermined interval, and the second signal represents the value YY1 such that $0 \leq YY1 \leq XX1$.

16. The method of claim 15 wherein for all the values in the LUT, $1 \leq X \leq 2$.

17. The method of claim 11 wherein:

$$FN(-X,Y) = FN(X,Y);$$
   $$FN(X,-Y) = FN(X,Y);$$

and $$FN(X,Y) = FN(Y,X).$$

18. The method of claim 11 wherein the LUT stores only values of the function FN for X in a predetermined interval, and when X is out of said predetermined interval the circuit calculates FN(X, Y) as FN(X/F, Y/F)+k(F) where F is such that X/F is in said predetermined interval, the value FN(X/F, Y/F) being provided by the LUT.

19. The method of claim 11 wherein FN(X, Y)=A * $\log_2(X^2+Y^2)$ where A is a predetermined constant.

20. The method of claim 19 wherein the LUT stores only values of the function FN for X in a predetermined interval, and when X is out of said predetermined interval the circuit calculates FN(X, Y) as FN(X/F, Y/F)+k(F) where F is such that X/F is in said predetermined interval, the value FN(X/F, Y/F) being provided by the LUT.

21. A circuit for determining a level of detail (LOD) to perform texture mapping to create an image by a computer, the circuit comprising a look-up table (LUT) for storing values of a predetermined function FN of at least two variables X and Y such that, for any positive constant F, $$FN(X/F,Y/F)=FN(X,Y)+k(F)$$

where k(F) is a function of F but not of X and Y, the circuit being for receiving signals S1 representing derivatives of texture coordinates (u,v) with respect to a first screen coordinate and using the LUT to generate a function of the derivatives, the circuit having an output for providing the LOD which is a function of the derivatives.

22. The circuit of claim 21 wherein the circuit is also for receiving a signal S2 representing derivatives of the texture coordinates with respect to a second screen coordinate and for using the LUT to generate a function of the derivatives with respect to the second screen coordinate, the LOD being a function of the derivatives with respect to the first and the second coordinates.

23. The circuit of claim 21 wherein the LUT stores values representing $(\frac{1}{2})\log_2(X^2+Y^2)$ for pairs (X,Y), such that for all the values in the LUT, $0 \leq Y \leq X$.

24. The circuit of claim 23 wherein when the circuit uses the LUT to generate the LOD, the circuit performs as follows:
- the circuit determines the values α and β such that α represents the maximum of the absolute values represented by signals S1 at inputs of the circuit and β represents the minimum of said absolute values;
- the circuit provides values α and β to the LUT;
- the circuit generates the LOD from the LUT output.

25. The circuit of claim 24 wherein for all the values in the LUT, X is in a predetermined interval, and α is in said predetermined interval, and β is such that $0 \leq \beta \leq \alpha$.

26. The circuit of claim 25 wherein for all the values in the LUT, $1 \leq X \leq 2$.

27. The circuit of claim 21 wherein:

$$FN(-X,Y)=FN(X,Y);$$

$$FN(X,-Y)=FN(X,Y);$$

and $$FN(X,Y)=FN(Y,X).$$

28. The circuit of claim 21 wherein the LUT stores only values of the function FN for X in a predetermined interval, and when X is out of said predetermined interval the circuit calculates FN(X, Y) as FN(X/F, Y/F)+k(F) where F is such that X/F is in said predetermined interval, the value FN(X/F, Y/F) being provided by the LUT.

29. The circuit of claim 21 wherein FN(X, Y)=A * $\log_2(X^2+Y^2)$ where A is a predetermined constant.

30. The circuit of claim 29 wherein the LUT stores only values of the function FN for X in a predetermined interval, and when X is out of said predetermined interval the circuit calculates FN(X, Y) as FN(X/F, Y/F)+k(F) where F is such that X/F is in said predetermined interval, the value FN(X/F, Y/F) being provided by the LUT.

31. The circuit of claim 30 wherein the LUT stores only values of the function FN for $Y \leq X$, and the circuit performs as follows:
- the circuit determines the absolute values of the derivatives $\partial u/\partial x$ and $\partial v/\partial x$ of the respective texture coordinates (u, v) with respect to the screen coordinate x which is said first screen coordinate, and the circuit determines the values X1 and Y1 such that X1 is the maximum of the absolute values of $\partial u/\partial x$ and $\partial v/\partial x$ and Y1 is the minimum of the absolute values of $\partial u/\partial x$ and $\partial v/\partial x$;
- the circuit provides the values X1/F1 and Y1/F1 as respective inputs X and Y to the LUT, where F1 is such that X1/F1 is in said predetermined interval, and the circuit obtains from the LUT the value A * $\log_2((X1/F1)^2+(Y1/F1)^2)$ and uses this value to determine a value B * $\log_2((\partial u/\partial x)^2+(\partial v/\partial x)^2)$ where B is a predetermined constant;
- the circuit determines the absolute values of derivatives $\partial u/\partial y$ and $\partial v/\partial y$ of the respective texture coordinates (u, v) with respect to another screen coordinate y, and determines the values X2 and Y2 such that X2 is the maximum of the absolute values of $\partial u/\partial y$ and $\partial v/\partial y$ and Y2 is the minimum of the absolute values of $\partial u/\partial y$ and $\partial v/\partial y$;
- the circuit provides the values X2/F2 and Y2/F2 as respective inputs X and Y to the LUT, where F2 is such that X2/F2 is in said predetermined interval, and the circuit obtains from the LUT the value A * $\log_2((X2/F2)^2+(Y2/F2)^2)$ and uses this value to determine B * $\log_2((\partial u/\partial y)^2+(\partial v/\partial y)^2)$;
- the circuit generates the LOD from the values B * $\log_2((\partial u/\partial x)^2+(\partial v/\partial x)^2)$ and B * $\log_2((\partial u/\partial y)^2+(\partial v/\partial y)^2)$.

32. The circuit of claim 31 wherein B=½, and the circuit generates the LOD as the maximum of the values B * $\log_2((\partial u/\partial x)^2+(\partial v/\partial x)^2)$ and B * $\log_2((\partial u/\partial y)^2+(\partial v/\partial y)^2)$.

33. The circuit of claim 31 wherein A=B=½.

* * * * *